(12) United States Patent
Campton et al.

(10) Patent No.: US 10,247,261 B2
(45) Date of Patent: Apr. 2, 2019

(54) CLUTCH ACTUATION USING DIFFERENTIAL PRESSURE

(71) Applicant: BorgWarner Inc., Auburn Hills, MI (US)

(72) Inventors: Calahan B. Campton, Royal Oak, MI (US); Brett Peglowski, Oakland, MI (US); Christopher A. Spangler, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 91 days.

(21) Appl. No.: 15/443,108

(22) Filed: Feb. 27, 2017

(65) Prior Publication Data

US 2017/0254372 A1    Sep. 7, 2017

Related U.S. Application Data

(60) Provisional application No. 62/302,120, filed on Mar. 1, 2016.

(51) Int. Cl.
| F16D 23/12 | (2006.01) |
| F16D 41/16 | (2006.01) |
| F16D 25/08 | (2006.01) |
| F16D 41/12 | (2006.01) |
| F16D 25/065 | (2006.01) |
| F16D 41/14 | (2006.01) |

(52) U.S. Cl.
CPC .......... *F16D 23/12* (2013.01); *F16D 25/065* (2013.01); *F16D 25/088* (2013.01); *F16D 41/12* (2013.01); *F16D 41/14* (2013.01); *F16D 41/16* (2013.01); *F16D 2023/123* (2013.01)

(58) Field of Classification Search
CPC .......... F16D 23/12; F16D 41/16; F16D 41/14; F16D 25/065; F16D 41/12; F16D 25/088; F16D 2023/123; F16D 2048/0209
See application file for complete search history.

(56) References Cited

U.S. PATENT DOCUMENTS

| 5,452,779 A * | 9/1995 | Gee .......................... B60T 11/20 192/12 C |
| 8,079,453 B2 | 12/2011 | Kimes |
| 2006/0006736 A1* | 1/2006 | Berger .................... F16D 48/02 303/117.1 |
| 2008/0000747 A1* | 1/2008 | Saka ...................... F16D 41/125 192/43.2 |
| 2015/0198241 A1* | 7/2015 | Barngrover ......... F16H 61/0251 137/1 |
| 2015/0354640 A1 | 12/2015 | Papania |

* cited by examiner

*Primary Examiner* — Jacob S. Scott
*Assistant Examiner* — Lillian T Nguyen
(74) *Attorney, Agent, or Firm* — Miller, Matthias & Hull LLP

(57) ABSTRACT

An actuation device having a piston is used to actuate a mechanical or friction clutch by means of differential pressure. Two sides of a piston are pressurized, and the relative pressure between the two sides is decreased or increased to move the piston in either direction. The position of the piston may be determined using position feedback, or with springs of known spring rates, two piston areas, and knowing the pressures of the two areas. The actuation device may be used with a selectable clutch to actuate an actuation cam, and may also have application with other clutches requiring the ability to achieve multiple positions and clutch modes.

14 Claims, 4 Drawing Sheets

CLUTCH ACTUATION USING DIFFERENTIAL PRESSURE

CROSS-REFERENCE TO RELATED APPLICATION

This patent application claims priority under 35 USC § 119(e) to U.S. Provisional Patent Application Ser. No. 62/302,120 filed on Mar. 1, 2016.

TECHNICAL FIELD

This disclosure relates generally to clutches, and in particular to clutches having multiple modes of engagement with a rotating element for selectively locking the element against rotation and allowing the element to rotate freely in one or both directions.

BACKGROUND

An automotive vehicle typically includes an internal combustion engine containing a rotary crankshaft configured to transfer motive power from the engine through a driveshaft to turn the wheels. A transmission is interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuated clutch units adapted to dynamically shift among variously available gear ratios without requiring driver intervention. Pluralities of such clutch units, also called clutch modules, are incorporated within such transmissions to facilitate the automatic gear ratio changes.

In an automatic transmission for an automobile, anywhere from three to ten forward gear ratios may be available, not including a reverse gear. The various gears may be structurally comprised of inner gears, intermediate gears such as planet or pinion gears supported by carriers, and outer ring gears. Specific transmission clutches may be associated with specific sets of the selectable gears within the transmission to facilitate the desired ratio changes.

Because automatic transmissions include pluralities of gear sets to accommodate multiple gear ratios, the reliability of actuators used for automatically switching clutch modules between and/or among various available operating modes is a consistent design concern. It is also desirable to provide smooth transitions between the operating modes when the clutch modules engage and disengage from the gears. These considerations are also important in other operating environments where selectable clutch modules may be implemented to selectively allow and restrict the rotation of rotating components such as gears, shafts, torque converter components and the like. Therefore, much effort has been directed to finding ways to assure actuator reliability and seamless performance at competitive costs.

SUMMARY OF THE DISCLOSURE

In one aspect of the present disclosure, an actuator device for a selectable clutch having a plurality of mode positions for controlling relative rotation between two components connected by the selectable clutch is disclosed. The actuator device may include a piston housing having an exterior surface, a piston housing longitudinal bore extending longitudinally there through, a first fluid passage extending inwardly from the exterior surface and intersecting the piston housing longitudinal bore proximate a first bore end, and a second fluid passage extending inwardly from the exterior surface and intersecting the piston housing longitudinal bore proximate a second bore end, and a piston having a piston body disposed within the piston housing longitudinal bore for longitudinal motion therein. A first pressure force acting on the piston body toward the second bore end is equal to a first pressure supplied at the first fluid passage multiplied by a first area equal to a first piston body cross-sectional area of the piston body, and a second pressure force acting on the piston body toward the first bore end is equal to a second pressure supplied at the second fluid passage multiplied by a second area equal to a second piston body cross-sectional area of the piston body.

In another aspect of the present disclosure, a selectable clutch is disclosed. The selectable clutch may include an outer race, an inner race rotatable relative to the outer race, a selective locking mechanism having a plurality of locking modes for controlling relative rotation between two components connected by the selectable clutch, actuator cam that is rotatable between a plurality of mode positions each causing the selective locking mechanism to engage one of the plurality of locking modes, and an actuator device such as that described in the preceding paragraph operatively connected to the actuator cam to move the selective locking mechanism between the plurality of mode positions as the main piston moves longitudinally within the piston housing longitudinal bore.

Additional aspects are defined by the claims of this patent.

DETAILED DESCRIPTION

Figure 1:
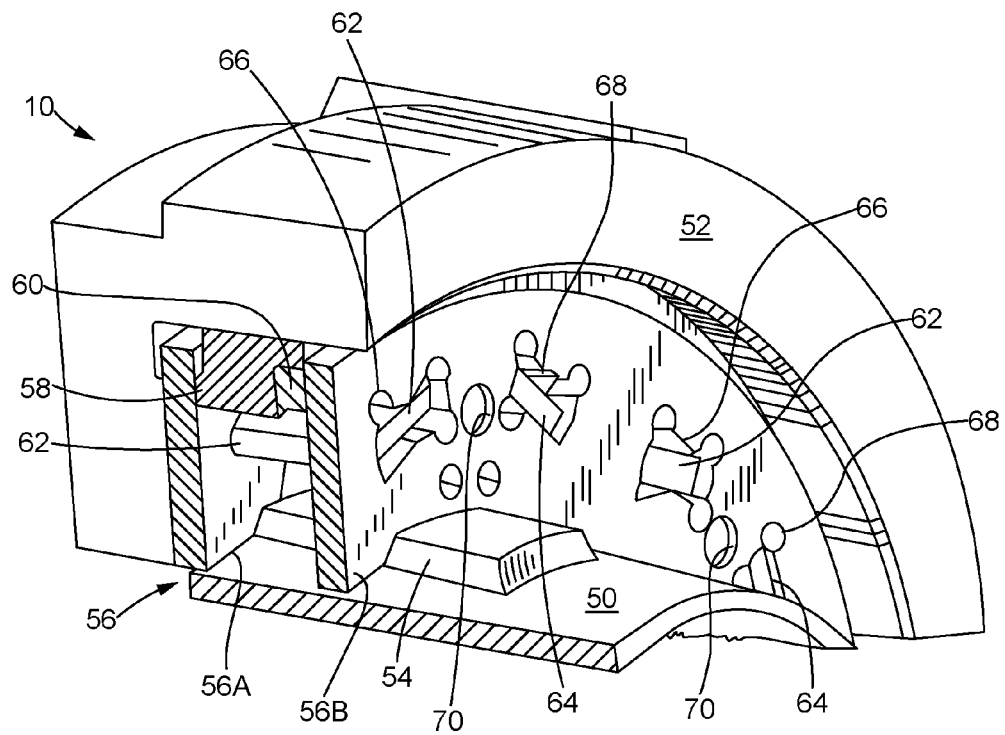
FIG. 1 is both a perspective and a cross-sectional view of a portion of one possible embodiment of a selectable in the form of a multimode clutch module that may be implemented in vehicles.

In accordance with the present disclosure, a selectable clutch, such as a multimode clutch module may be implemented at various locations of a vehicle (not shown) to provide multiple modes for connecting and disconnecting rotatable components to prevent or allow, respectively, relative rotation between two components. Referring to FIG. 1, a multimode clutch 10 of a vehicle may be of the type illustrated and described in Intl. Publ. No. WO 2014/120595 A1, published on Aug. 7, 2014, by Papania, entitled "Multi-Mode Clutch Module," which is expressly incorporated by reference herein. While the multimode clutch 10 is illustrated and described herein, those skilled in art will understand that actuator devices in accordance with the present disclosure may be implemented with other types of selectable clutches providing multiple modes for connecting and disconnecting rotatable components to prevent or allow, respectively, relative rotation between two components, and the use of the actuator device with such selectable clutches is contemplated by the inventors. In the illustrated embodiment, the multimode clutch 10 may incorporate an interior driven hub 50 and an outer housing 52 that may be locked for rotation together in some modes of the multimode clutch 10 and may be unlocked for independent rotation with respect to each other in other modes of the multimode clutch 10 as will be described more fully below. The driven hub 50 may contain an array of circumferentially spaced cogs 54 adapted to secure an inner race 56 to the driven hub 50 for rotation therewith. As disclosed, the inner race 56 is comprised of first and second spaced plates 56A and 56B. An outer race 58 sandwiched between the pair of inner race plates 56A, 56B, is situated so as to allow for relative rotation between inner race 56 and the outer race 58, and with the outer race 58 being operatively coupled to the outer housing 52 for rotation therewith.

In the present design of the multimode clutch 10, an actuator cam 60 is interposed between one of the race plates 56A, 56B and the outer race 58 for rotation over a predetermined angle about a common axis of the driven hub 50 and the outer housing 52 to control movements of pairs of opposed pawls 62, 64 as will be described further hereinafter. The sets of pawls 62, 64 are trapped, and hence retained, between the inner race plates 56A, 56B to allow limited angular movements of the pawls 62, 64 held within bowtie shaped apertures 66, 68, respectively, subject to the control of the actuator cam 60. In each set, the combined pawl 62 and corresponding aperture 66 is similar to but oppositely oriented to the combined pawl 64 and corresponding aperture 68. The elements of the multimode clutch 10 are contained within the outer housing 52. A plurality of spaced apertures 70 are adapted to accommodate rivets (not shown) for providing fixed and rigid securement of each of the two inner race plates 56A and 56B relative to the other.

Figure 2:
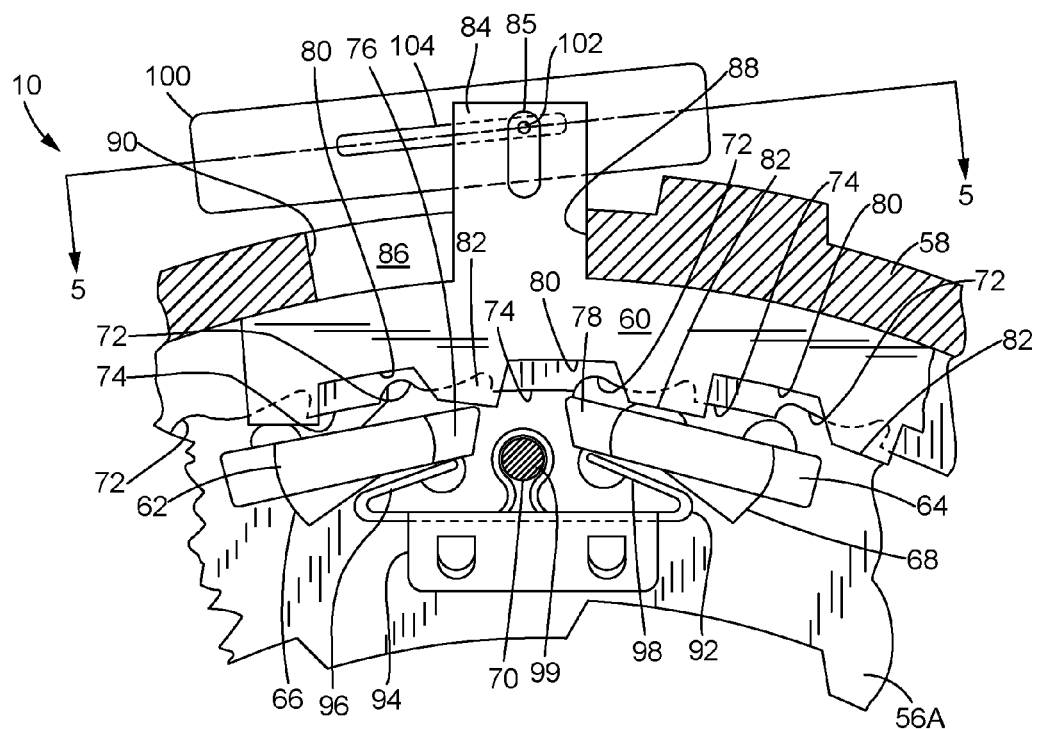
FIG. 2 is an enlarged side view of a portion of one possible embodiment of the multimode clutch module of FIG. 1 with the near inner race plate removed to reveal the internal components, and with an actuator cam in a one-way locked, one-way unlocked position.
Figure 3:
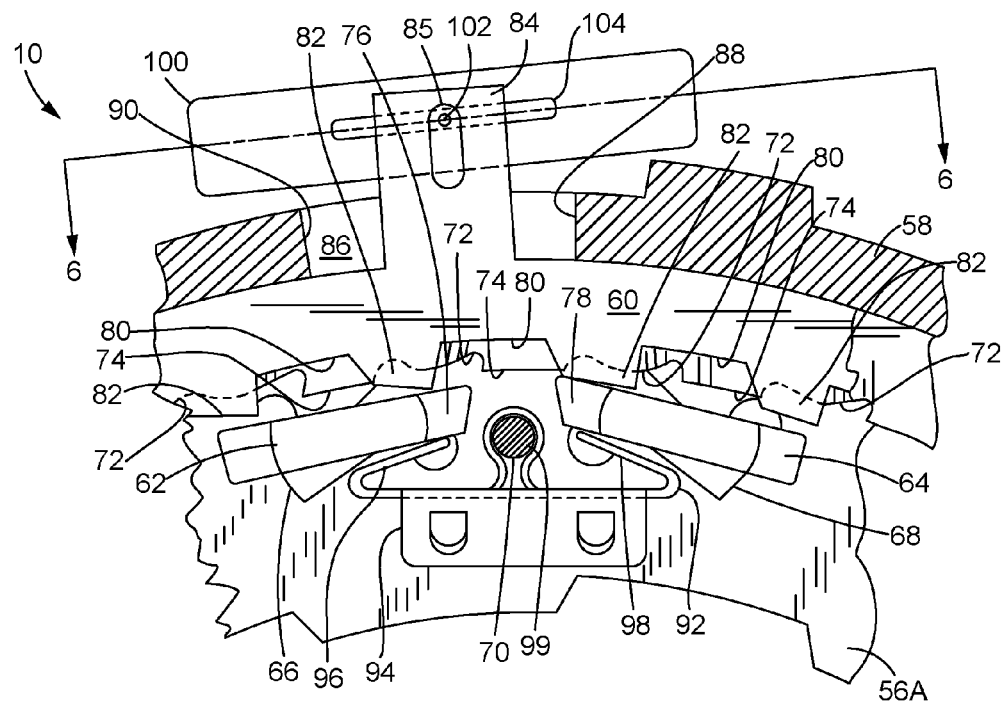
FIG. 3 is the enlarge view of one possible embodiment of the multimode clutch module of FIG. 1 with the actuator cam in a two-way unlocked position.
Figure 4:
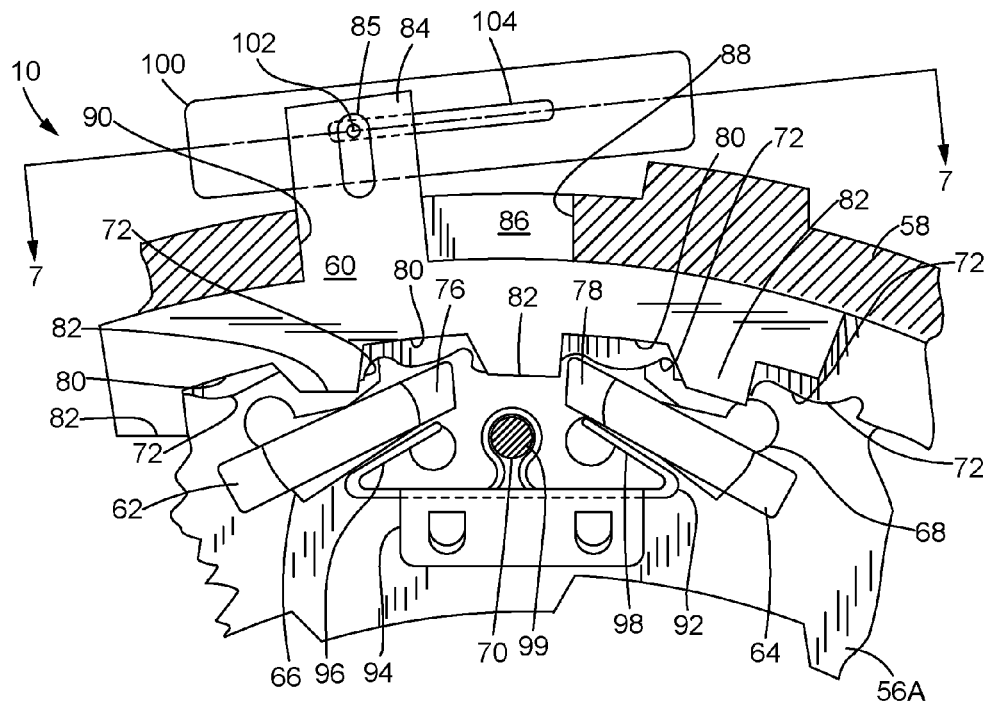
FIG. 4 is the enlarge view of the multimode clutch module of FIG. 1 with the actuator cam in a two-way locked position.

The operational components of the multimode clutch 10 are illustrated in FIGS. 2-4 that illustrate the various operational modes of the multimode clutch 10 for controlling the relative rotation between the components attached to the driven hub 50 and the outer housing 52. Referring first to FIG. 2, the outer race 58 is configured to accommodate interactions with the pawls 62, 64 by providing the inner circumference of the outer race 58 with circumferentially spaced notches 72, each defined by and positioned between pairs of radially inwardly projecting cogs 74. The notches 72 and cogs 74 are configured so that, in the absence of the actuator cam 60, a toe end 76 of each pawl 62 enters one of the notches 72 and is engaged by the corresponding cog 74 when the driven hub 50 and the inner race 56 rotate in a clockwise direction as viewed in FIG. 2 relative to the outer housing 52 and the outer race 58 to cause the connected components to rotate together. Similarly, a toe end 78 of each pawl 64 enters one of the notches 72 and is engaged by the corresponding cog 74 when the driven hub 50 and the inner race 56 rotate in a counterclockwise direction relative to the outer housing 52 and the outer race 58 to cause the connected components to rotate together.

Within its interior periphery, the actuator cam 60 incorporates a strategically situated array of circumferentially spaced recesses, herein called slots 80, defined by and situated between projections, herein called cam teeth 82. The slots 80 and cam teeth 82 are adapted to interact with the pawls 62, 64 to control their movement within the apertures 66, 68, respectively, and disposition within the notches 72 and engagement by the cogs 74 as will be described. The actuator cam 60 may further include an actuator tab 84 or other appropriate member or surface that may be engaged by an actuator device 100 that is capable of causing the actuator cam 60 to move through its rotational range to the positions shown in FIGS. 2-4. The actuator device 100 may be any appropriate actuation mechanism capable of moving the actuator cam 60, such as a hydraulic actuator as illustrated and described below operatively coupled to the actuator cam 60 and capable of rotating the actuator cam 60 to multiple positions. The actuator tab 84 may include a radially extending slot 85 that receives a cam actuator bar 102 extending from a longitudinally extending slot 104 of the actuator device 100. The cam actuator bar 102 may transmit forces from the actuator device 100 to rotate the actuator cam 60 in the clockwise and counterclockwise directions. The interconnection between the actuator cam 60 and the actuator device 100 is illustrative, and alternative arrangements and linkages facilitating conversion of translational motion of the actuator device 100 into rotational motion of the actuator cam 60 to shift between a plurality of available clutch modes are contemplated and will be apparent to those skilled in the art. In the illustrated embodiment, the actuator tab 84 may be disposed within a slot 86 through the outer race and the rotation of the actuator cam 60 may be limited by a first limit surface 88 engaging the actuator tab 84 at the position shown in FIG. 2 and a second limit surface 90 engaging the actuator tab 84 at the position shown in FIG. 4.

The pawls 62, 64 are asymmetrically shaped, and reversely identical. Each of the opposed pawls 62, 64 is movably retained within its own bowtie-shaped pawl aperture 66, 68, respectively, of the inner race plates 56A and 56B. The toe end 76, 78 of each individual pawl 62, 64, respectively, is urged radially outwardly via a spring 92. Each spring 92 has a base 94, and a pair of spring arms 96 and 98. The spring arms 96 bear against the bottoms of the pawls 62, while the spring arms 98 bear against the bottoms of the pawls 64, each to urge respective toe ends 76, 78 into engagement with the cogs 74 of the outer race 58 when not obstructed by the cam teeth 82 of the actuator cam 60. It will be appreciated from FIG. 2 that axially extending rivets 99 are used to secure the inner race plates 56A, 56B together. The rivets 99 extend through the apertures 70 in each of the plates 56A, 56B to hold the two plates 56A, 56B rigidly together, and to thus assure against any relative rotation with respect to the plates 56A, 56B. In lieu of the rivets 99, other structural fasteners may be employed within the scope of this disclosure to secure the inner race plates 56A, 56B.

It will be appreciated that the actuator device 100 ultimately controls the actuator tab 84 which, in turn, moves the actuator cam 60 between multiple distinct angular positions. Thus, the positioning of the pawls 62, 64 as axially retained between the riveted inner race plates 56A, 56B is directly controlled by the actuator cam 60 against forces of springs 92. In FIG. 2, the actuator tab 84 is shown positioned by the actuator device 100 in a first, angularly rightward selectable position, representative of a first, one-way locked, one-way unlocked or open mode. In this position, the slots 80 and cam teeth 82 of the actuator cam 60 are positioned so that the toe ends 76 of the pawls 62 are blocked by cam teeth 82 from engagement with notches 72, and hence with the cogs 74 on the interior of the outer race 58. As such, the inner race 56 is enabled to freewheel relative to the outer race 58, and to thus provide for an overrunning condition when the inner race 56 and the driven hub 50 are rotating clockwise relative to the outer race 58 and the outer housing 52. Conversely, however, the position of the actuator cam 60 allows of the toe ends 78 of the pawls 64 to enter the slots 80 of the actuator cam 60 due to the biasing force of the spring arms 98, and to thereby directly engage the cogs 74 of the outer race 58 to lock the inner race 56 and the outer race 58 together whenever the inner race 56 and the driven hub 50 undergo a driving, or counterclockwise rotational movement, thereby causing the driven hub 50 and the outer housing 52 to rotate together.

FIG. 3 illustrates the actuator tab 84 placed by the actuator device 100 in a second, intermediate selectable position, representative of a two-way unlocked or open mode of the multimode clutch 10. In this position, the slots 80 and the cam teeth 82 of the actuator cam 60 are positioned to prevent the toe ends 76, 78 of both pawls 62, 64 from entering the slots 80 of the actuator cam 60, and to maintain disengagement from the cogs 74 of the outer race 58. With the pawls 62, 64 blocked from engagement with the cogs 74, the inner race 56 and the driven hub 50 are enabled to freewheel relative to the outer race 58 and the outer housing 52 during relative rotation in either the clockwise or the counterclockwise direction.

In FIG. 4, the actuator tab 84 is shown in a third, angularly leftward selectable position, representative of a two-way locked mode of the multimode clutch 10. In this configuration, the actuator cam 60 is positioned so that the toe ends 76, 78 of both pawls 62, 64 enter the slots 80 of the actuator cam 60 under the biasing forces of the spring arms 96, 98, respectively, and are engaged by the cogs 74 of the outer race 58 as described above to lock the inner race 56 and the driven hub 50 to the outer race 58 and the outer housing 52 for rotation therewith, irrespective of the rotational direction of the inner race 56 and the driven hub 50.

Even though one specific embodiment of the multimode clutch 10 is illustrated and described herein, those skilled in the art will understand that alternative configurations of multimode clutches and other selectable clutches are possible that provide operational modes or positions as alternatives or in addition to two-way unlocked and two-way locked modes (FIGS. 3 and 4), and the one-way locked, one-way unlocked mode (FIG. 2). For example, an additional one-way locked, one-way unlocked mode that may provide for an overrunning condition when the inner race 56 and the driven hub 50 are rotating counter clockwise relative to the outer race 58 and the outer housing 52, and to lock the inner race 56 and the outer race 58 together whenever the inner race 56 and the driven hub 50 undergo a clockwise rotational movement so the driven hub 50 and the outer housing 52 rotate together. Moreover, alternate structures providing some or all of the modes discuss herein for selectable clutches may be implemented in a similar manner in vehicles, such as that illustrated and described in U.S. Pat. No. 8,079,453, published on Dec. 20, 2011, by Kimes, entitled "Controllable Overrunning Coupling Assembly." The implementation of such alternative selectable clutches in vehicles and controlling the mode switching using such clutches with actuator devices in accordance with the present disclosure would be within the capabilities of those skilled in the art and is contemplated by the inventors.

Figure 5:
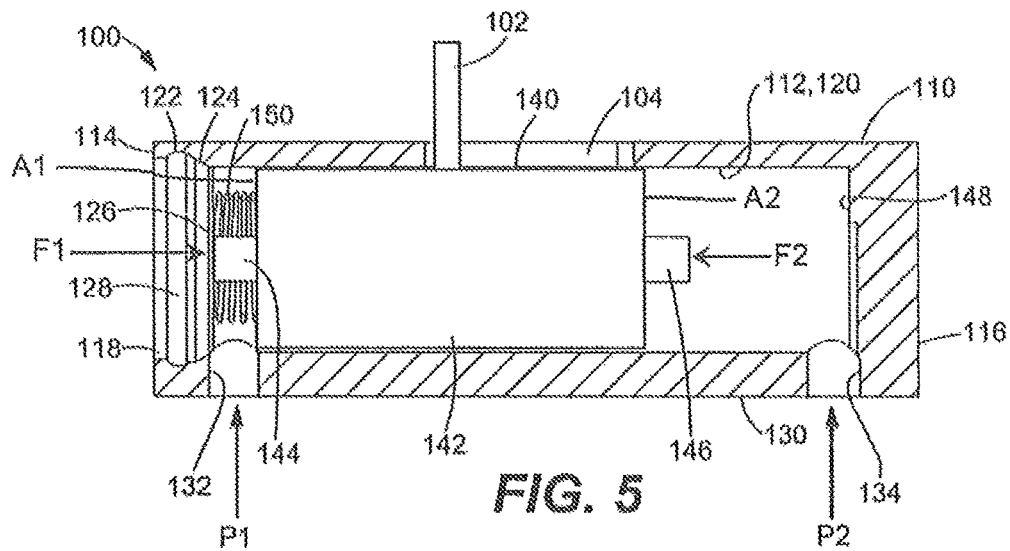
FIG. 5 is a cross-sectional view taken through line 5-5 of FIG. 2 of an embodiment of an actuator device in accordance with the present disclosure in position to place the actuator cam in the one-way locked, one-way unlocked position.

FIG. 5 illustrates one embodiment of the actuator device 100 shown in a cross-sectional view taken through line 5-5 of FIG. 2. The actuator device 100 may include a piston housing 110 having a longitudinal bore 112 extending inwardly into the piston housing 110 from an open end 114 to a closed end 116 disposed opposite the open end 114. The longitudinal bore 112 may have a generally constant inner diameter as the longitudinal bore 112 extends inwardly to accommodate various internal components of the actuator device 100. However, the longitudinal bore 112 may include a cap bore portion 118 proximate the open end 114 that transitions to a main bore portion 120 having a constant inner diameter. The longitudinal bore 112 may further define a cap snap ring annular groove 122 in the cap bore portion 118 having a larger inner diameter than the cap bore portion 118, and a cap engagement surface 124 configured to receive and engage a cap 126 inserted through the open end 114 of the longitudinal bore 112 to retain the internal components within the actuator device 100. The cap 126 may be held in place by a cap snap ring 128. The cap snap ring 128 may be annular and have an outer diameter that is greater than the inner diameter of the cap bore portion 118, and may be pressed into the cap snap ring annular groove 122 to lock the cap 126 in place.

Additional passages may be defined in the piston housing 110. The longitudinal slot 104 may extend inwardly from an exterior surface 130 of the piston housing 110 and intersect the longitudinal bore 112 approximately midway between the open end 114 and the closed end 116. A first fluid passage 132 may extend inwardly from the exterior surface 130 and intersect the main bore portion 120 proximate the open end 114. A second fluid passage 134 may extend inwardly from the exterior surface 130 and intersect the main bore portion 120 proximate the closed end 116. The first fluid passage 132 and the second fluid passage 134 may be configured for connection to conduits (not shown) from fluid sources (not shown) of the vehicle for provision hydraulic fluid to opposite ends of the main bore portion 120. As discussed further below, one or both of the fluid passages 132, 134 may be connected to pressurized fluid sources providing hydraulic fluid with varying pressures to control the operation of the actuator device 100 and, correspondingly, the multimode clutch 10.

The actuator device 100 may include a piston 140 disposed within the longitudinal bore 112 and slidable back and forth in the longitudinal direction within the longitudinal bore 112. The piston 140 may include a piston body 142 having a first piston stop 144 and a second piston stop 146 extending outwardly longitudinally from opposite sides of the piston body 142. The first piston stop 144 may engage the cap 126 and the second piston stop 146 may engage a closed end wall 148 to ensure that the piston body 142 is maintained between the first fluid passage 132 and the second fluid passage 134. The piston body 142 may have a piston body outer diameter that is less than the inner diameter of the main bore portion 120 so that the piston 140 may slide therein without leakage of hydraulic fluid there between. If necessary, appropriate seals (not shown) may be provided at the interface between the main bore portion 120 and the piston body 142 to further prevent leakage of hydraulic fluid. The cam actuator bar 102 may have an end operatively connected to the piston body 152 and extend outwardly through the longitudinal slot 104 to the exterior of the piston housing 110.

Figure 6:
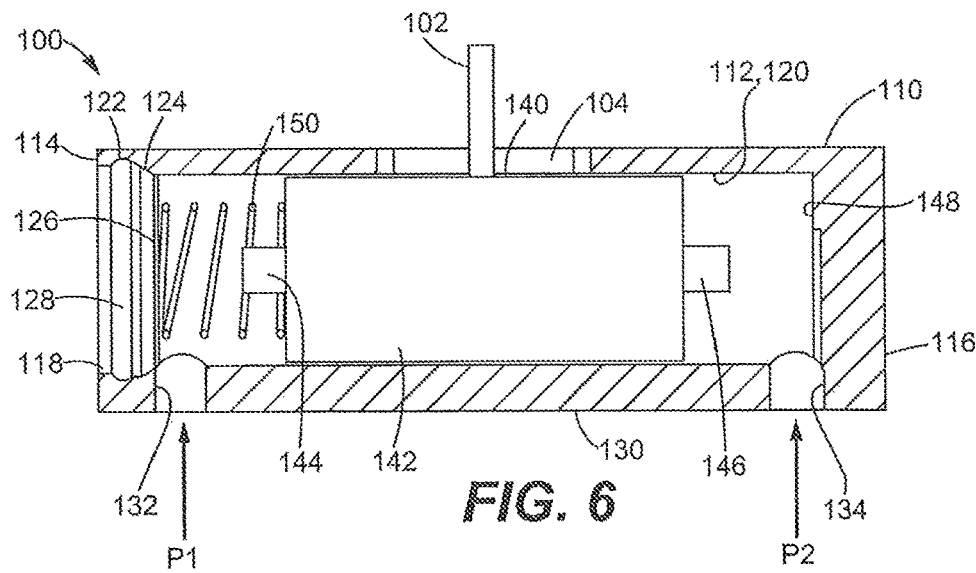
FIG. 6 is a cross-sectional view taken through line 6-6 of FIG. 3 of the embodiment of the actuator device in position to place the actuator cam in the two-way unlocked position.
Figure 7:
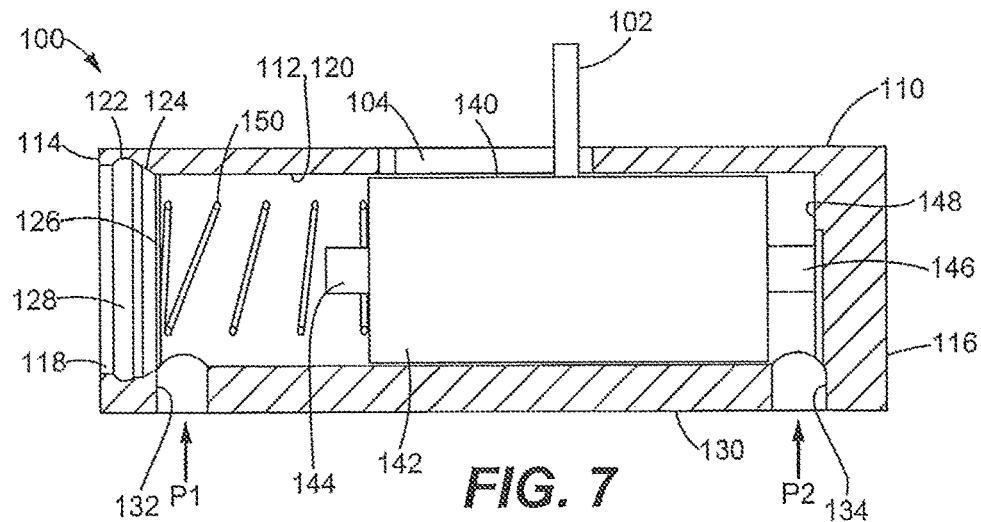
FIG. 7 is a cross-sectional view taken through line 7-7 of FIG. 4 of the embodiment of the actuator device in position to place the actuator cam in the one-way locked, one-way unlocked position.

A piston spring 150 may be disposed within the main bore portion 120 of the longitudinal bore 112 to provide a biasing force on the piston 140. In the illustrated embodiment, the piston spring 150 may be compressed between the cap 126 and the piston 140 to provide a force biasing the piston 140 toward the closed open end 116 of the longitudinal bore 112. Absent other forces acting on the piston 140, the piston spring 150 will move the piston 140 to the right as shown in FIGS. 5-7 until the second piston stop 146 is engaged by the closed end wall 148. With this arrangement, the actuator device 100 may default to the mode position shown in FIG. 7. The piston spring 150 may be placed on the opposite side of the piston 140 if it is desired to cause the actuator device 100 to default to the mode position shown in FIG. 5. If the middle mode position shown in FIG. 6 is the default mode position, a second piston spring 150 may be provided opposite the first piston spring 150 to apply spring forces to the piston 140 in opposite directions. Depending on the particular implementation, the spring constants k of the piston springs 150 may be varied to default the actuator device 100 to any position between the end positions shown in FIGS. 5 and 7. In still further embodiments, the piston spring 150 may be omitted and the actuator device 100 will not have a default mode position.

In the illustrated embodiment, the position of the piston 140, the cam actuator bar 102 and, correspondingly, the actuator cam 60 will be dictated by a first pressure P1 at the first fluid passage 132, a second pressure P2 at the second fluid passage 134, and the amount of compression of the piston spring 150. The first pressure P1 acts on the piston body 142 to exert a first pressure force F1 to the right in as seen in FIG. 5, and has a magnitude equal to P1×A1, where A1 is the cross-sectional area of the right side of the piston body 142. The second pressure P2 acts on the opposite side of the piston body 142 to exert a second pressure force F2 on the piston 140 to the left. The second pressure force F2 has a magnitude equal to P2×A2, where A2 is the cross-sectional area of the left side of the piston body 142. In the illustrated embodiment, the area A1 is equal to the area A2. In other implementations, the area A1 and the area A2 may be different depending on the configuration of the piston 140 and its connection to the piston housing 110. In either configuration, the equations and relationships discussed hereinafter will have equal applicability. Finally, the piston spring 150 exerts a spring force FS on the piston 140 to the right having a magnitude equal to kX, where k is the spring constant for the piston spring 150 and X is the amount of compression of the piston spring 150. It is contemplated that the spring constant k will have a constant value over the operating range of the actuator device 100.

In the present example, the first pressure P1 may have a value that is approximately constant and equal to a system pressure of the vehicle that is known to the control system causing changes in the position of the actuator device 100 and the mode of the multimode clutch 10. The second pressure P2 may be a control pressure that may be varied by controlling an output pressure of a pressurized hydraulic fluid source (not shown) in fluid communication with the second fluid passage 134. As a result, the second pressure P2 is controlled and varied to move the piston 140 and the cam actuator bar 102.

As seen in FIG. 5, the piston 140 is moved to the left with the first piston stop 144 engaged by cap 126. In this position, the cam actuator bar 102 has moved the actuator cam 60 to the first mode position shown in FIG. 2. The force equation for this position may be expressed as $F1+FS \leq F2$, or $P1*A1+kX \leq P2*A2$. Holding the second pressure P2 constant, or increasing the second pressure P2, will maintain the piston 140 at the left limit position and keep the multimode clutch 10 in the first mode.

When a controller (not shown) of the vehicle detects that the multimode clutch 10 should move to a second mode such as that shown in FIG. 3, the controller may cause the pressurized hydraulic fluid source to reduce the second pressure P2. When the force equation changes to $F1+FS>F2$, or $P1*A1+kX>P2*A2$, the first pressure force F1 and the spring force FS may overcome the second pressure force F2 and cause the piston 140 to begin to move to the right toward the second mode position shown in FIG. 6. As the piston 140 moves toward the second mode position, the controller may receive position sensor signals from a position sensor (not shown) containing values indicating a sensed position of a component of the multimode clutch 100, the actuator device 100 or other component that is indicative of the state of the actuator cam 60 in transitioning from the first mode position to the second mode position. For example, the position sensor may be operatively connected to the actuator cam 60, the actuator tab 84 or the cam actuator bar 102. Upon receiving the position sensor signals, the controller may further adjust the second pressure P2 as necessary arrive at and maintain the piston 140 at the second mode position of FIG. 6.

Once the piston 140 and, correspondingly, the actuator cam 60 arrive at the second mode position, the controller may set the second pressure P2 at a value that restores the force equation to equilibrium such that $F1+FS=F2$, or $P1*A1+kX=P2*A2$. It will be apparent that the spring force FS is less at the second mode position due to the elongation of the piston spring 150. Correspondingly, the second pressure P2 and the second pressure force F2 will be less than at the first mode position of FIG. 5. From the second mode position, the second pressure P2 may be decreased to cause the piston 140 to move to the right toward the third mode position of FIG. 7, or increased to cause the piston 140 to move to the left and return to the first mode position of FIG. 5.

Figure 8:
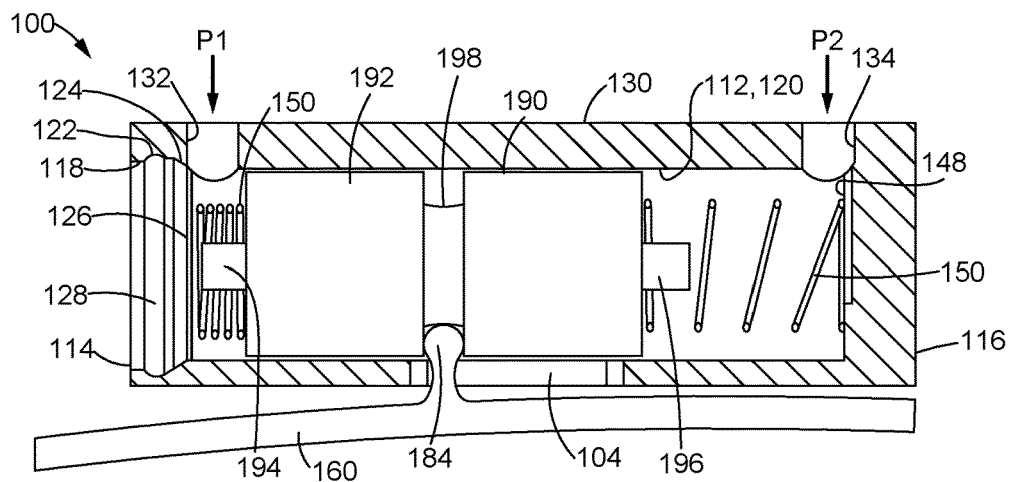
FIG. 8 is a cross-sectional view taken through line 5-5 of FIG. 2 of an alternative embodiment of an actuator device in accordance with the present disclosure in position to place the actuator cam in the one-way locked, one-way unlocked position.
Figure 9:
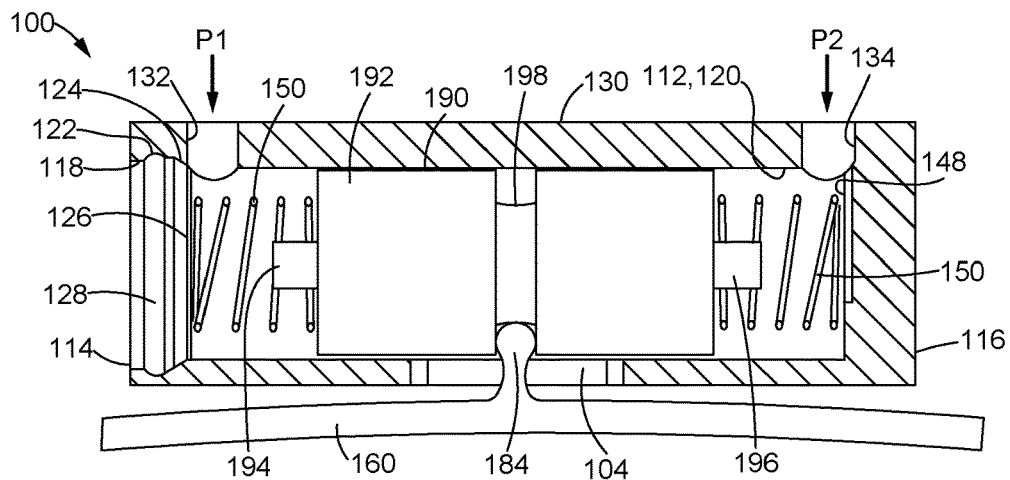
FIG. 9 is a cross-sectional view taken through line 6-6 of FIG. 3 of the alternative embodiment of the actuator device in position to place the actuator cam in the two-way unlocked position.
Figure 10:
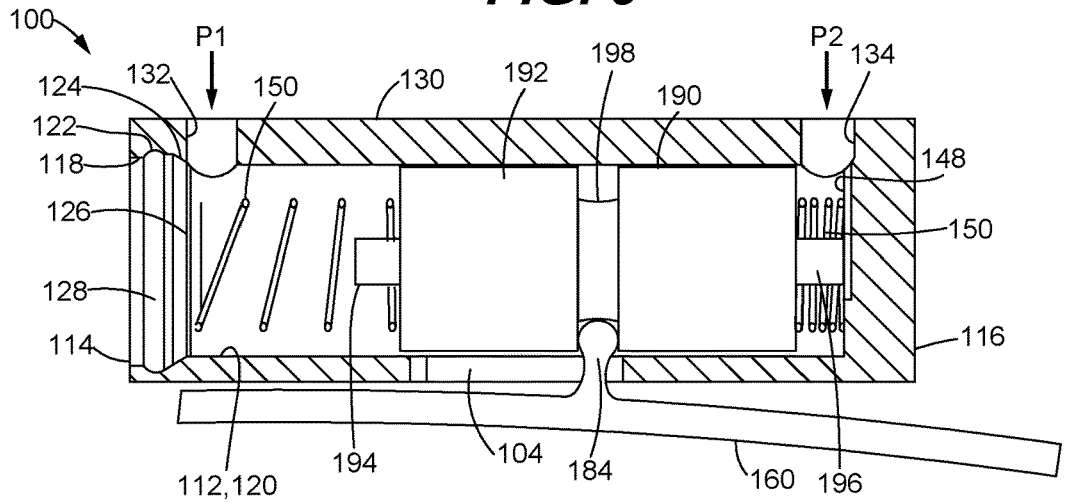
FIG. 10 is a cross-sectional view taken through line 7-7 of FIG. 4 of the alternative embodiment of the actuator device in position to place the actuator cam in the one-way locked, one-way unlocked position.

FIGS. 8-10 illustrate an alternative embodiment of the actuator device 100 configured to be operatively connected to a multimode clutch 10 having an actuator cam 160 with an actuator tab 184 extending therefrom. The actuator cam 160 may operate in a similar manner as the actuator cam 60 to switch the multimode clutch 10 between mode positions as the actuator cam 160 is rotated about a rotational axis of the multimode clutch 10. The piston housing 110 may have a similar configuration as described above. A piston 190 may be disposed within the longitudinal bore 112 and slidable back and forth in the longitudinal direction within the longitudinal bore 112. The piston 190 may have generally the same configuration as the piston 140 described above, and may include a piston body 192 having a first piston stop 194 and a second piston stop 196 extending outwardly longitudinally from opposite sides of the piston body 192 to limit the travel of the piston 190 in each direction in the manner described above. The piston body 192 may have a piston body outer diameter that is less than the inner diameter of the main bore portion 120 so that the piston 190 may slide therein without leakage of hydraulic fluid there between. If necessary, appropriate seals (not shown) may be provided at the interface between the main bore portion 120 and the piston body 192 to further prevent leakage of hydraulic fluid.

The piston 190 may be configured to engage the actuator tab 184 by providing an annular groove 198 at approximately the longitudinal center of the piston body 192. The annular groove 198 may be sufficiently wide and deep so that the actuator tab 184 may be inserted through the longitudinal slot 104 and received by the annular groove 198. The actuator tab 184 may be rounded to facilitate rotation of the actuator tab 184 within the annular groove 198, and rotation of the actuator cam 160 about the rotational axis of the multimode clutch 10, as the piston 190 moves from the first mode position of FIG. 8, past the second mode position of FIG. 9 and to the third mode position of FIG. 10.

The embodiment of FIGS. 8-10 further illustrates the use of piston springs 150 on both sides of the piston 190 so that the actuator device 100 may have a default mode position that is between the first mode position and the third mode position. The second piston spring 150 may be taken into accounted in the control strategy by adding a second spring force FS2 to the force equation acting in the same direction as the second pressure force F2. In other respects, the control strategy for the multimode clutch 10 and the actuator device 100 may perform substantially as described above.

INDUSTRIAL APPLICABILITY

The illustrated configuration of the actuator device 100 and the control strategy for changing the position of the actuator device 100 discussed herein may be advantageous in applications where a selectable clutch has four or more clutch modes. The actuator device 100 provides infinite mode positions that will be dictated by the pressures, the cross-sectional areas of the pistons 140, 190, and the spring forces applied by the piston spring(s) 150. Those skilled in the art will understand that the control strategy for the actuator device 100 may be configured stop the pistons 140, 190 at additional intermediate mode positions at which a different engagement mode will be provide between the components connected by the selectable clutch. By creating an actuator device 100 wherein the pistons 140, 190 can be positioned using differential pressures within the piston housing 110, three or more modes for the multimode clutch 10 can be achieved by changing the pressure differential acting on the single piston 140, 190.

Those skilled in the art will further understand that the configuration of the actuator device 100 and the control strategy described herein are exemplary, and modifications of the design are contemplated. For example, in alternative embodiments, the second pressure P2 may be held constant and the first pressure P1 may be controlled to move the piston 140 to the right (increase the first pressure P1) and to the left (decrease the first pressure P1). In further alternatives, both pressures P1, P2 may be controlled so that a pressure differential is varied to move the piston 140. Such variations are contemplated by the inventors as having use in actuator devices in accordance with the present disclosure.

The design may be further varied in terms of the location and presence of the piston spring(s) 150. The piston spring 150 may be moved to other locations in and around the actuator device 100 while still having an effect on the response and control of the pistons 140, 190. For example, the piston spring 150 in FIGS. 5-7 could be moved to the opposite side of the piston 140 and positioned between the piston 140 and the closed end wall 148. In this position, the piston spring 150 would bias the piston 140 toward the one-way locked, one-way unlocked position of FIG. 5. In these embodiments, the spring force FS would be subtracted from the first pressure force F1 in the equations discussed above. With the spring force FS assisting the second pressure force F2 in moving the piston 140 to the left, lower second pressures P2 will need to be generated to move the piston 140 between the locking positions.

In other embodiments, the piston spring 150 may be located external to the piston housing 110, and still be operatively connected to the cam actuator bar 102 (FIGS. 5-7) to provide the spring force FS to the piston 140. For example, the piston spring 150 may be coupled between a stationary portion of the vehicle, such as the vehicle frame, and the cam actuator bar 102. Alternatively, the piston spring 150 may be connected between the stationary structure and the cam actuator 60, 160 that will transfer the spring force FS of the piston spring 150 to the pistons 140, 190 through the intervening connection provided by the cam actuator bar 102 (FIGS. 5-7) or the actuator tab 184 and the annular groove 198 (FIGS. 8-10). Such external arrangements of the piston spring 150 can function to apply the spring force FS in either direction to either work against or assist the second pressure force F2 in moving the pistons 140, 190 between the locking positions, or in both directions to bias the pistons 140, 190 toward an intermediate locking position.

As discussed above, in further alternative embodiments, the piston spring 180 may be omitted so that no spring force FS acts on the piston 150. In such embodiments, the controlled first pressure P1 will be adjusted accordingly to reflect the absence of the spring force FS from the force balancing equations discussed above. With the spring force FS omitted, the curve of the graph 190 will move downward by an amount that is less than in the situation above where the spring force FS is shifted to assisting the first pressure force F1, but removal of the piston spring 180 will still lower first pressures P1 required to move the piston 150 between the locking positions.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An actuator device for a selectable clutch having a plurality of mode positions for controlling relative rotation between two components connected by the selectable clutch, the actuator device comprising:
    a piston housing having an exterior surface, a piston housing longitudinal bore extending longitudinally there through, a first fluid passage extending inwardly from the exterior surface and intersecting the piston housing longitudinal bore proximate a first bore end, and a second fluid passage extending inwardly from the exterior surface and intersecting the piston housing longitudinal bore proximate a second bore end; and
    a piston having a piston body disposed within the piston housing longitudinal bore for longitudinal motion therein,
    wherein a first pressure force acting on the piston body toward the second bore end is equal to a first pressure supplied at the first fluid passage multiplied by a cross-sectional area of a first side of the piston body,
    wherein a second pressure force acting on the piston body toward the first bore end is equal to a second pressure supplied at the second fluid passage multiplied by a cross-sectional area of a second side of the piston body,
    wherein the piston housing includes a longitudinal slot extending inwardly from the exterior surface and intersecting the piston housing longitudinal bore, and
    wherein the actuator device comprises a cam actuator bar mounted to the piston body and extending through the longitudinal slot so that the cam actuator bar can be operatively connected to an actuator cam of the selectable clutch to move the selectable clutch between the plurality of mode positions as the piston moves longitudinally within the piston housing longitudinal bore.

2. The actuator device according to claim 1, comprising a first piston spring operatively connected to the piston body, wherein a first spring force of the first piston spring acting on the piston body toward one of the first bore end and the second bore end is equal to a first spring constant for the first piston spring multiplied by a first compression amount of the first piston spring.

3. The actuator device according to claim 2, wherein the first spring force biases the piston toward the second bore end.

4. The actuator device according to claim 3, wherein the piston moves toward the second bore end when the first pressure force plus the first spring force is greater than the second pressure force.

5. The actuator device according to claim 3, wherein the piston moves toward the first bore end when the first pressure force plus the first spring force is less than the second pressure force.

6. The actuator device according to claim 3, wherein the piston remains stationary when the first pressure force plus the first spring force is equal to the second pressure force.

7. The actuator device according to claim 3, comprising a second piston spring operatively connected to the piston body and biasing the piston toward the first bore end, wherein a second spring force of the second piston spring acting on the piston body toward the first bore end is equal to a second spring constant for the second piston spring multiplied by a second compression amount of the second piston spring, wherein the piston moves toward the second bore end when the first pressure force plus the first spring force is greater than the second pressure force plus the second spring force, wherein the piston moves toward the first bore end when the first pressure force plus the first spring force is less than the second pressure force plus the second spring force, and wherein the piston remains stationary when the first pressure force plus the first spring force is equal to the second pressure force plus the second spring force.

8. The actuator device according to claim 1, wherein the piston comprises
    a first piston stop extending from the piston body and limiting movement of the piston body toward the first bore end in a longitudinal direction; and
    a second piston stop extending from the piston body and limiting movement of the piston body toward the second bore end in the longitudinal direction.

9. A selectable clutch comprising:
    an outer race;
    an inner race rotatable relative to the outer race;
    a selective locking mechanism having a plurality of locking modes for controlling relative rotation between two components connected by the selectable clutch;
    an actuator cam that is rotatable between a plurality of mode positions each causing the selective locking mechanism to engage one of the plurality of locking modes; and
    the actuator device according to claim 1 operatively connected to the actuator cam to move the selective locking mechanism between the plurality of mode positions as the piston moves longitudinally within the piston housing longitudinal bore.

10. The selectable clutch according to claim 9, wherein the piston housing comprises a longitudinal slot extending inwardly from the exterior surface and intersection the piston housing longitudinal bore, and wherein the actuator device comprises a cam actuator bar mounted to the piston, extending through the longitudinal slot and operatively connected to the actuator cam to move the actuator cam between the plurality of mode positions.

11. The selectable clutch according to claim 10, wherein the actuator cam comprises an actuator tab operatively connected to the cam actuator bar.

12. The selectable clutch according to claim 11, wherein the actuator tab has a radially extending slot receiving the cam actuator bar.

13. The selectable clutch according to claim 9, wherein the piston housing comprises a longitudinal slot extending inwardly from the exterior surface and intersection the piston housing longitudinal bore, and wherein the actuator cam comprises an actuator tab extending from the actuator cam and through the longitudinal slot and operatively connected to the piston to move the actuator cam between the plurality of mode positions when the piston moves within the piston housing longitudinal bore.

14. The selectable clutch according to claim 13, wherein the piston comprises an annular groove in the piston body receiving the actuator tab and engaging the actuator tab to move the actuator cam as the piston moves within the piston housing longitudinal bore.

* * * * *